(12) United States Patent
Kato et al.

(10) Patent No.: US 9,652,778 B1
(45) Date of Patent: *May 16, 2017

(54) ADVERTISEMENT CONVERSION LOGGING

(71) Applicant: GOOGLE INC., Mountain View, CA (US)

(72) Inventors: Sadayuki Kato, Tokyo (JP); Gregor Hohpe, San Francisco, CA (US)

(73) Assignee: Google Inc., Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 14/307,459

(22) Filed: Jun. 17, 2014

Related U.S. Application Data

(63) Continuation of application No. 13/214,912, filed on Aug. 22, 2011, now Pat. No. 8,768,765.

(51) Int. Cl.
G06Q 30/00 (2012.01)
G06Q 30/02 (2012.01)

(52) U.S. Cl.
CPC .............. *G06Q 30/0242* (2013.01)

(58) Field of Classification Search
CPC .............. G06Q 30/0251; G06Q 30/0242
USPC .............................................. 705/14
See application file for complete search history.

(56) References Cited

U.S. PATENT DOCUMENTS

| | | | |
|---|---|---|---|
| 2007/0185768 A1* | 8/2007 | Vengroff | G06Q 30/02 705/14.64 |
| 2012/0029997 A1* | 2/2012 | Khan | G06Q 30/0226 705/14.27 |
| 2012/0245995 A1* | 9/2012 | Chawla | G06Q 30/02 705/14.45 |
| 2012/0278172 A1 | 11/2012 | Mercuri et al. | |
| 2013/0304588 A1 | 11/2013 | Jinasena | |

FOREIGN PATENT DOCUMENTS

JP 2008021303 A 1/2008

OTHER PUBLICATIONS

Butcher, "McDonald's Goes with Near Field Communications for Sales Lift", Mobile Commerce Daily; retrieved from www.mobilecommercedaily.com, 0/14/2010, 1-3.

(Continued)

*Primary Examiner* — Matthew L Hamilton
(74) *Attorney, Agent, or Firm* — Foley & Lardner LLP; John D. Lanza

(57) ABSTRACT

An advertisement distribution system can log advertisement conversions using Near Field Communication ("NFC"). An online advertisement may be served to a user in response to a query or at a website. In response to the user selecting the advertisement, a landing page is displayed to the user and information regarding the advertisement is stored for logging purposes. The landing page may instruct the user to check in with an NFC-enabled device at an NFC base station of a merchant. The NFC base station transmits information identifying the merchant to the user's device and, in turn, the user's device transmits the information to the advertisement distribution system. The advertisement distribution determines that the advertisement resulted in a conversion using information regarding the advertisement and the information identifying the merchant received from the NFC base station via the user's device.

23 Claims, 3 Drawing Sheets

(56) References Cited

OTHER PUBLICATIONS

Hamilton, "Office Action issued in copending U.S. Appl. No. 13/214,912, filed Aug. 22, 2011", Jul. 26, 2013, 1-13.
Hirata, "Derwent Acc. No. 2008-B74954", Abstracted Pub. No. JP 2008021303A, Jun. 2006, 1-3.
Mpamugo, "Office Action issued in copending U.S. Appl. No. 14/181,167, filed Feb. 14, 2014", Aug. 26, 2014, 1-9.
Owen, "Improving the Value and Performance of Online Offers", First Data—Beyond the Transaction, Jan. 1, 2012, 1-10.
Unknown, "Stamp Card Feature Added to Gurunavi Touch", Retrieved from http://www.gnavi.co.jp/company/english/release/2007/ with an auto-generated machine translation, Nov. 2007, 1-4.
U.S. Appl. No. 13/905,098 to Coatney et al. filed May 29, 2013.
U.S. Appl. No. 14/181,167 to Stuttle et al. filed Feb. 14, 2014.

\* cited by examiner

ADVERTISEMENT CONVERSION LOGGING

REFERENCE TO RELATED APPLICATIONS

This patent application is a continuation of and claims priority to U.S. patent application Ser. No. 13/214,912, filed on Aug. 22, 2011 and entitled "Advertisement Conversion Logging." The entire contents of the above-identified priority application are hereby fully incorporated herein by reference.

TECHNICAL FIELD

The present disclosure relates generally to logging advertisement conversions and, more specifically to logging advertisement conversions using Near Field Communication ("NFC").

BACKGROUND

The conversion ratio of advertisements is an important measure of the effectiveness of the advertisements and directly translates into return on investment ("ROI") for the advertiser. For example, the conversion ratio can be thought of as the percentage of customers that take a specific action, such as make a purchase or visit a store location, based on an advertisement impression. Advertisers can use this information to improve their process of selecting potential customers to serve advertisements to. Furthermore, the knowledge of a positive ROI makes it easier for the advertisers to justify advertisement expenditures.

Accurate conversion logging is one of the benefits of online advertising, typically enabled through the use of browser cookies and script snippets on advertisers' landing pages. For example, advertisers may be able to view the percentage of users that selected an advertisement and also added an item to their virtual shopping cart or completed a purchase online. However, brick and mortar businesses, such as restaurants, retail shops, and service providers, are not able to measure the effectiveness of an online advertisement campaign in the same manner. The most relevant conversion logging for these businesses occurs by receiving a telephone call or having a customer visit their store. Conventional conversion logging mechanisms are unable to log such signals.

SUMMARY

In certain exemplary embodiments, a computer-implemented method for logging advertisement conversions includes a computer transmitting an advertisement associated with an advertiser for presentation on a user device. The computer receives information identifying the advertisement in response to an impression of the advertisement on the user device. The user device receives information identifying the merchant from a Near Field Communication ("NFC") device at a location associated with the merchant. The computer receives the information identifying a merchant from the user device. The computer determines whether the advertiser associated with the advertisement is the merchant. In response to a determination that the advertiser associated with the advertisement is the merchant, the computer logs conversion information indicating that the advertisement resulted in a conversion.

In certain exemplary embodiments, a method for logging advertisement conversions includes a user device receiving an advertisement associated with an advertiser. The user device stores information regarding the advertisement in response to the advertisement being received at the user device. The user device receives information identifying a merchant from an item located at a location of the merchant. If the advertiser associated with the advertisement is the merchant, then conversion information is logged indicating that the advertisement resulted in a conversion.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

BRIEF DESCRIPTION OF THE DRAWINGS

FIG. 2, depict a method for logging advertisement conversions using NFC, in accordance with certain exemplary embodiments.

DETAILED DESCRIPTION OF EXEMPLARY EMBODIMENTS

Overview

Figure 1:
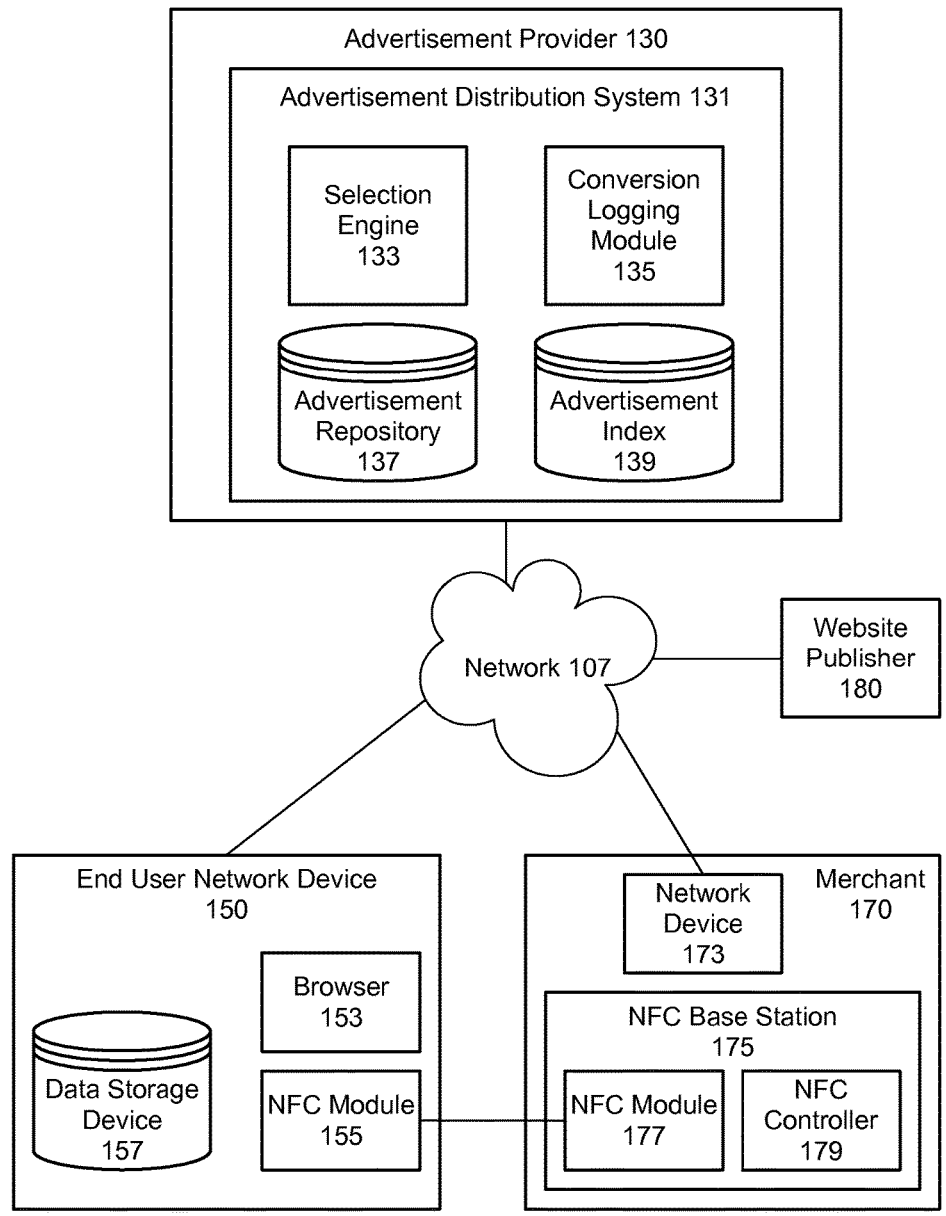
FIG. 1 depicts a system for logging advertisement conversions using Near Field Communication ("NFC"), in accordance with certain exemplary embodiments.

The methods and systems described herein enable physical logging of advertisement conversions using Near Field Communication ("NFC"). An exemplary system includes an advertisement distribution system implemented in hardware and/or software. The advertisement distribution system selects and provides advertisements to another entity in response to a query or a request for advertisements. For example, the advertisement distribution system may provide advertisements to a user device via an Internet web page when the user accesses a website or submits a query at a search engine. The advertisements may be presented to the user via a browser application module. Information regarding the advertisements may be stored on the user device.

In certain exemplary embodiments, information regarding each advertisement presented by the user device is stored on the user device for use in advertisement conversion logging. In certain exemplary embodiments, information regarding advertisements selected by the user is stored on the user device for use in advertisement conversion logging. Thus, a conversion can be logged for advertisement impressions and/or advertisement selections. An advertisement impression is a view or presentation of an advertisement. For example, the number of advertisement impressions for a given advertisement can be the number of times that the advertisement is presented to an end user or the number of times that the advertisement is transmitted to an end user network device. The information regarding the advertisements may be stored in the form of a cookie, token, or other computer-readable data item.

The system also includes an NFC base station located at a merchant's location. For simplicity, manufacturers, retailers, wholesalers, restaurants, service providers, and others that sell products or services to customers or advertise to users are interchangeably referred to herein as "merchants." Users having an NFC-enabled device can place their device near the NFC base station to check in at the merchant's location. The NFC-enabled user device and the NFC base station can establish a secure NFC communication channel. During the check in process, the NFC base station can provide to the user's device information identifying the merchant, the particular location of the merchant, and/or the NFC base station. The user's device can transmit the information received from the NFC base station to the advertisement distribution system. The user's device also may transmit the information regarding the advertisement stored on the user's device to the advertisement distribution system. The advertisement distribution system can use the received information to determine that the advertisement resulted in a conversion. In certain exemplary embodiments, a module of the user device may determine, using the information regarding the advertisement and the information received from the NFC base station, whether one of the advertisements resulted in a conversion. If so, the user device may transmit information to the advertisement distribution system indicating that the advertisement resulted in a conversion. Thus, information indicating that a user visited a location of an advertiser and received (or selected) an advertisement associated with the advertiser can be used to determine whether the advertisement resulted in a conversion.

As the process of checking in via NFC at merchant's locations is generally an optional process for the customers, the advertisement distribution system may provide an incentive to the customers to check in. For example, an advertisement provided by the advertisement distribution system may include a link to a landing web page that includes instructions to a merchant's location. This landing web page also may include a coupon, discount, or other promotional offer that the customer can redeem if the user checks in at the merchant's NFC base station. The details of the promotional offer may be kept secret from the customer until the customer checks in with the NFC base station. For example, the landing web page may include a message that states, "Please visit Joe's restaurant on Main Street and check in at the NFC base station to receive a special offer!"

Although exemplary embodiments are described in terms of an NFC-based system, other forms or short-range communication systems also could be used in place of or in addition to NFC. For example, Bluetooth, induction wireless, infrared wireless, WiFi, RFID, or another wireless or wired technology known to one of ordinary skill in the art may be used in place of or in addition to NFC without departing from the scope and spirit of the present invention.

Information identifying an advertiser or information indicating that a user visited a location of an advertiser or merchant can be received from a static item, such as a bar code or quick response ("QR") code. For example, the user device may include a bar code scanner for scanning bar codes or QR codes. The bar code or QR code may be unique for each advertiser, merchant, or merchant location.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer. The functionality of the exemplary embodiments will be explained in more detail in the following description, read in conjunction with the figures illustrating the program flow.

Users may be allowed to limit or otherwise affect the operation of the features disclosed in the specification. For example, users may be given opportunities to opt-in or opt-out of the collection or use of certain data or the activation of certain features. In addition, users may be given the opportunity to change the manner in which the features are employed, including for situations in which users may have concerns regarding their privacy. Instructions also may be provided to users to notify them regarding policies about the use of information, including personally identifiable information, and manners in which they may affect such use of information. Thus, sensitive personal information can be used to benefit a user, if desired, through receipt of relevant advertisements or other information, without risking disclosure of personal information or the user's identity.

Turning now to the drawings, in which like numerals indicate like (but not necessarily identical) elements throughout the figures, exemplary embodiments are described in detail.

System Architecture

FIG. 1 depicts a system 100 for logging advertisement conversions using Near Field Communication ("NFC"), in accordance with certain exemplary embodiments. As depicted in FIG. 1, the exemplary system 100 includes an advertisement provider network device 130, end user network devices 150, merchant network devices 173 each being associated with a respective merchant 170, and a website publisher network device 180. The network devices 130, 150, 173, 180 are configured to communicate with one another via one or more networks 107. Each network 107 includes a wired or wireless telecommunication means by which network devices (including devices 130, 150, 173, 180) can exchange data. For example, each network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any form of information that can exist in a computer-based environment.

The network devices 130, 150, 173, 180 each include a device capable of transmitting and receiving data over the network 107. For example, each network device 130, 150, 173, 180 can include a server, desktop computer, laptop computer, cellular telephone, smartphone, handheld computer, tablet computer, personal digital assistant ("PDA"), or any other wired or wireless, processor-driven device. In certain exemplary embodiments, the end user network devices 150 are NFC-enabled mobile devices, such as smartphones, PDAs or tablet computers.

As shown in FIG. 1, the end user network devices 150 include a browser application module 153, such as Microsoft Internet Explorer, Firefox, Netscape, Google Chrome, or another suitable application for interacting with web page files. The web page files can include text, graphic, images, sound, video, and other multimedia or data files than can be transmitted via the network 107. For example, the web page files can include one or more files in the HyperText Markup Language ("HTML").

In certain exemplary embodiments, the web page files include content maintained by the website publisher 180 and advertisements maintained by an advertisement distribution system 131 of the advertisement provider 130. For example, the website publisher 180 may include one or more advertisements on web pages published by the website publisher 180. The website publisher 180 may request advertisements from the advertisement provider network device 130 to include with the web pages, for example based on the content of the web pages. Or, the websites published by the website publisher 180 may include computer-readable code, such as scripts or applets, that request advertisements from the advertisement provider network device 130.

In certain exemplary embodiments, the advertisement provider 130 may be associated with or include an Internet search engine, such as a product search or shopping website (not shown). The Internet search engine may receive queries and provide search results in response to the queries in the form of web page documents. Along with the search results, the Internet search engine may provide advertisements that are presented via the web page documents.

In certain exemplary embodiments, the end user network devices 150 include one or more application modules in addition to or in place of the browser application module 153. For example, the end user network devices 150 may include gaming applications, productivity applications, shopping applications, and/or social networking applications that display content via mechanisms other than web page files. The advertisement provider 130 may provide advertisements that are displayed by these applications. For example, an application provider that provides the application modules and facilitates the use of the application modules may request advertisements from the advertisement provider 130 and transmit those advertisements to the end user network devices 150 for display via the application modules.

The end user network devices 150 also include an NFC module 155 for communicating with NFC base stations, such as NFC base stations 175 positioned at locations of the merchants 170. Although not shown, the NFC module 155 typically includes an NFC controller and an NFC antenna for communicating with the NFC base stations 175 and other NFC-enabled devices. The end user network devices 150 also include a data storage device 157, such as Read Only Memory ("ROM"), Random-Access Memory ("RAM"), flash memory, and/or other types of removable or non-removable memory. The data storage device 157 stores, among other things, information received from other devices, such as the advertisement provider network device 130, the NFC base stations 175, and the website publisher 180.

The NFC base stations 175 each include an NFC controller 179 and an NFC module 177 for communicating with user network device NFC modules 155. The NFC controller 179 may be embodied as a microcontroller, microprocessor, or other computing device. In certain exemplary embodiments, the NFC controller 179 stores an encrypted key and an NFC device identifier that identifies the NFC base station 175, the merchant 170, and/or a particular location of the merchant 170. The advertisement provider 130 uses the NFC device identifier of the NFC base station to log advertisement conversions, as discussed below. The cryptographic key enables the NFC microcontroller 179 to provide a secure signature for data transmitted from the NFC base station 175 to another device, such as the end user network devices 150. The advertisement provider network device 130 also may include the cryptographic key or a corresponding key so that the advertisement provider network device 130 can authenticate information purportedly received from the NFC base station 175.

The advertisement provider network device 130 includes an advertisement distribution and conversion logging system 131 referred to herein as an advertisement distribution system 131 for brevity. The advertisement distribution system 131 includes an advertisement repository 137 that stores advertisements and a selection engine 133 that selects from advertisements stored in the advertisement repository 137 to transmit in response to a query or a request for advertisements. The advertisement distribution system 131 also includes a conversion logging module 135 that logs advertisement conversions for advertisers, such as the merchants 170. This conversion logging information is compiled and stored in an advertisement index 139 of the advertisement distribution system 131. In certain exemplary embodiments, the conversion logging module 135 and advertisement index 139 are part of a logging server (not shown) communicably coupled to the advertisement provider network device 130.

The components of the exemplary system 100 are described in more detail hereinafter with reference to the method illustrated in FIG. 2.

System Process

Figure 2A:
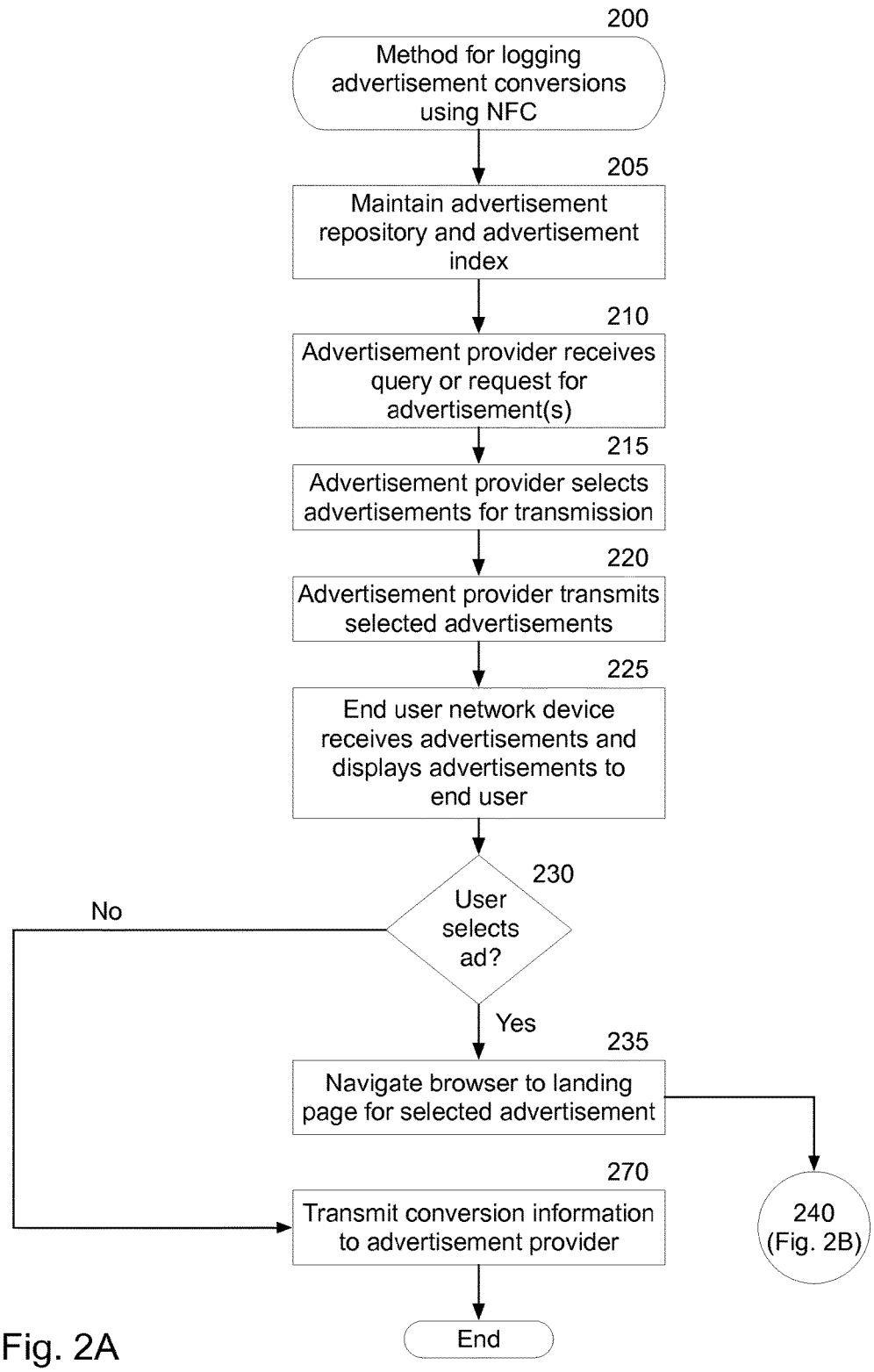
FIGS. 2A and 2B, collectively
Figure 2B:
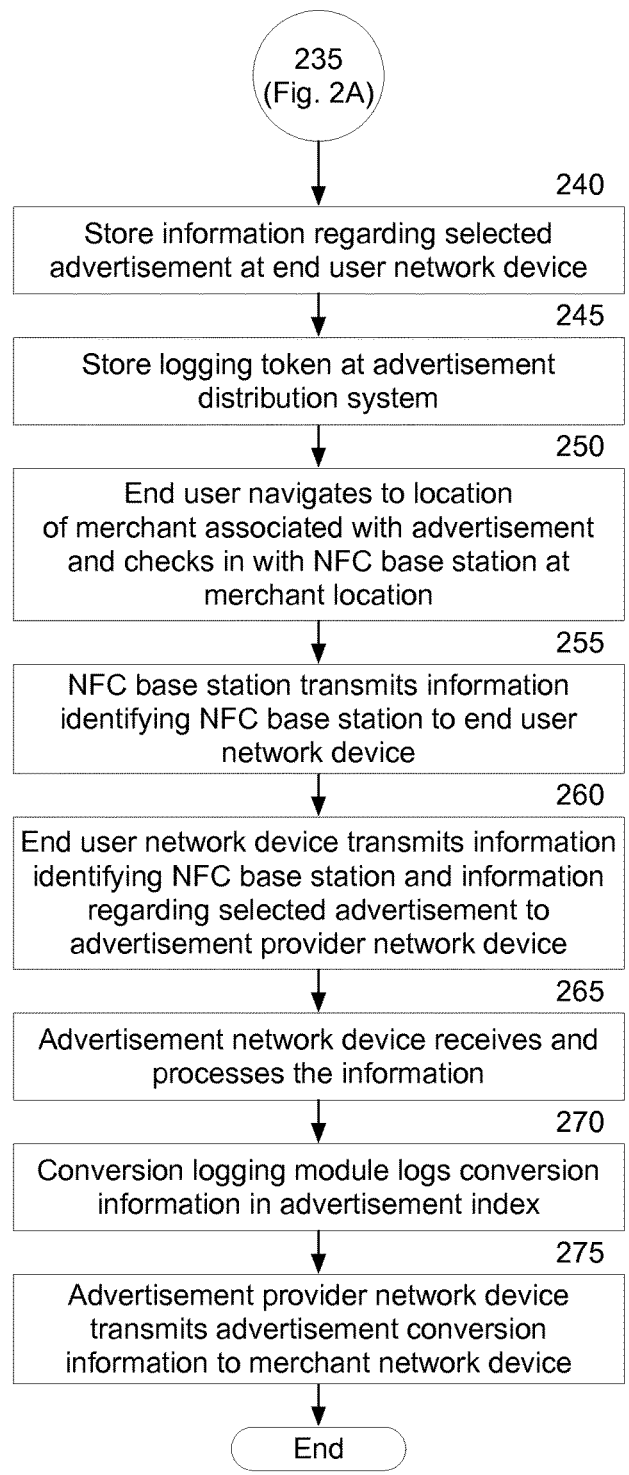

FIGS. 2A and 2B, collectively FIG. 2, depict a method for logging advertisement conversions using NFC, in accordance with certain exemplary embodiments. The method 200 is described with reference to the components illustrated in FIG. 1.

In block 205, the advertisement distribution system 131 maintains the advertisement repository 137 and the advertisement index 139. The advertisement repository 137 and the advertisement index 139 each include a data structure, such as one or more databases and/or electronic records. The advertisement repository 137 stores copies of advertisements and/or content regarding products or services to serve in the form of advertisements. The advertisements stored in the advertisement repository 137 may be received from various advertisers, such as the merchants 170, manufacturers, retailers, wholesalers, restaurants, service providers, non-profits, community organizations, churches, individuals, or any other entity that desires to serve advertisements or other content. In addition to or in place of advertisements, other promotional content may be stored in the advertisement repository 137, such as coupons, discounts, and event notifications.

In certain exemplary embodiments, a receiver module (not shown) of the advertisement provider network device 130 receives the advertisements in electronic data feeds and/or hard copy provided by the advertisers. For example, each merchant 170 may periodically provide batched or unbatched advertisements in an electronic feed to the receiver module.

The advertisement index 139 stores advertisement conversion information for each advertisement stored in the advertisement repository 137 and, optionally, criteria for serving the advertisements. The criteria for serving the advertisements can be received from the respective advertisers, such as the merchants 170. The criteria can be based upon aspects of a received search query, a series of received search queries, user demographic information, user location information, advertisement bid information, advertisement performance information, information contained in an advertisement request, and/or any other criteria suitable for use in selecting advertisements known to one of ordinary skill in the art having the benefit of the present disclosure.

The criteria can be received from the advertisers so that the advertiser has control in selecting recipients for their advertisements.

The advertisement conversion information can include, for each advertisement, the number of times the advertisement was presented to a user, the number of times the advertisement was selected after being presented, and the number of times one or more specific actions were taken after the advertisement was presented. For example, the specific action may be whether a product subject to the advertisement was added to a virtual shopping cart, purchased online, and/or the recipient of the advertisement visited a location of the advertiser or a merchant that offers the product subject to the advertisement. The advertisement index 139 can include information for one or multiple actions so that each action can be logged and used to compute an advertisement conversion ratio or percentage for that action. One example of an advertisement conversion percentage is the percentage of customers that visit a location associated with an advertisement after receiving the advertisement. Another example of an advertisement conversion percentage is the percentage of customers that visit a location associated with an advertisement after selecting the advertisement using their respective end user network device 150.

In block 210, the advertisement provider network device 130 receives a query or request for an advertisement. For example, an end user operating the end user network device 150 may submit a query to an Internet search engine via the browser application module 153. The advertisement provider network device 130 may receive this query directly from the end user network device 150 or via the Internet search engine. In another example, a third party website or application module may submit a request for advertisements to the advertisement provider network device 130. This request for advertisements can include a number of advertisements requested, criteria for selecting the advertisements, content of the third party website or other contextual information, and/or information regarding a potential recipient of the advertisements. For example, a third party website or mobile application may include an applet or other computer program code for requesting, receiving, and displaying advertisements from the advertisement provider network device 130.

In block 215, the selection engine 133 of the advertisement distribution system 131 selects advertisements from available advertisements stored in the advertisement repository 137 to transmit in response to the query or the advertisement request. If the advertisements are selected in response to a query, the selection engine 133 may select advertisements based on terms of the search query, demographic information of the user submitting the query if available, location information of the user if available, and/or the criteria for the advertisements stored in the advertisement index 139. Of course, end users may be given the option to opt out of providing demographic and location information. If the advertisements are selected in response to a request, the selection engine 133 may select advertisements based on the information included with the request, criteria specified in the request, and the criteria for the advertisements stored in the advertisement index 139. Other information also can be used to select appropriate advertisements to serve to an end user.

In block 220, the advertisement provider network device 130 transmits the selected advertisements to the end user network device 150. In one example, the advertisement provider network device 130 transmits a web page document containing search results and the advertisements to the end user network device 150 in response to a query. In another example, the advertisement provider network device 130 transmits the advertisements to an Internet search engine and the Internet search engine transmits a web page document containing search results and the advertisements to the end user network device 150 in response to a query. In yet another example, the advertisement provider network device 130 transmits the advertisements to the website publisher 180 in response to a request and the website publisher 180 transmits the advertisements to the end user network device 150. The website publisher 180 may transmit the advertisements to the end user network device 150 along with a web page document. Or, an applet or other software module of a web page document transmitted by the website publisher 180 may request the advertisements from the advertisement provider 130

In certain exemplary embodiments, the location of the end user network device 150 is transmitted to the advertisement provider network device 130 and used to select advertisements related to the user's locations. This location information can be transmitted at the time that a query is transmitted or while the user is interacting with another application that displays advertisements. In this way, the advertisement distribution system 131 can serve advertisements relevant to the user's location. For example, if the query includes the terms "pizza" and "restaurant," the advertisement distribution system 131 can provide search results and advertisements for pizza restaurants near the users' location. As mentioned above, the user may be given the option to opt out of this location feature.

In block 225, the end user network device 150 receives the advertisements and the browser application module 153 (or other application) presents the advertisements to the user operating the end user network device 150. The end user then has the option to select one of the advertisements if one of the advertisements is of interest to the user.

In block 230, if the user selected an advertisement, the method 200 follows the "Yes" branch to block 235. Otherwise, if the user did not select an advertisement, the method 200 follows the "No" branch to block 270.

In block 270, the browser application module 153 (or other application displaying advertisements) transmits information to the advertisement provider network device 130 indicating that the advertisements were not selected by the user. If appropriate. the conversion logging module 135 can then update the conversion information for the presented advertisements in the advertisement index 139. The selection engine 133 also may update advertisement performance information in the advertisement index 139 for the presented advertisements.

In block 235, the browser application module 153 (or other application) causes a landing web page associated with the selected advertisement to be displayed. For example, the browser application module 153 may request the landing web page from a network device of the advertiser associated with the selected advertisement. Or, an application may cause the browser application module 153 to open and request the landing web page.

The landing page may include information regarding a product or service associated with the advertisement. The landing page also may include directions or information identifying the location of a merchant 170 or other entity that provides the product or service. For example, the landing page may include an address to a merchant location or a map having directions for the user's current location (if available) to the merchant location.

The landing page also may include a promotional offer and directions for redeeming the promotional offer via an NFC base station 175. For example, the landing page may include a message such as, "Please proceed to Tasty Pizza on Main Street and check in with the NFC base station there to receive free bread sticks with any pizza order." The promotional offer may be kept secret from the user until the user checks in with the NFC base station 175. For example, the landing page may include a message such as, "Please proceed to Tasty Pizza on Main Street and check in with the NFC base station to receive a special discount." Details of the promotional offer may be downloaded to the end user network device 150 and presented by the end user network device 150 in response to the end user network device 150 establishing a communication channel with the NFC base station 175. In certain exemplary embodiments, the NFC base station 175 may include or be communicably coupled to a monitor and/or printer that displays/prints the promotional offer. Or, an employee of the merchant 170 may provide the promotional offer upon check in with the NFC base station 175.

The landing page also can include any other information related to the selected advertisement, the advertiser, or the merchant 170 that provides the product or service subject to the selected advertisement. For example, the landing page may include current promotional offers, inventory information at the merchant's location, certain products available at the merchant's location, or a restaurant menu.

The promotional offer may be in the form of a coupon, discount, reward points, free item, such as a free appetizer at a restaurant, or online status. For example, the advertisement provider 130 may log each NFC base station 175 that each end user checks in with. This logged information may be used to determine an online status for the user, such as "Frequent User" or "Novice." The logged information also may be used to determine other promotional offers to provide to the end user. For example, an end user that has checked in with many NFC base stations 175 or with the same NFC base station 175 many times, may be given more valuable (or less valuable) promotional offers. The end users 150 may be given the option to opt out of the information logging feature.

The merchant 170 in which the landing page provides instructions for redeeming the promotional offer does not necessarily have to be directly associated with the advertiser. For example, if the advertisement is related to a television advertised by the manufacturer of the television, the landing page may provide directions to a merchant 170 that sells that television.

In block 240, information regarding the selected advertisement is stored on the end user network device 150, for example in the data storage device 157. In one embodiment the landing page downloads a cookie onto the end user network device 150 that includes information regarding the selected advertisement. The cookie can include an advertisement identifier, such as a unique code for the advertisement, information identifying the date and time that the advertisement was downloaded to the end user network device 150, information regarding the advertiser or product associated with the advertisement. As discussed below, this information is used to determine whether the selected advertisement resulted in a conversion.

In certain exemplary embodiments, the advertisement distribution system 131 determines that an advertisement resulted in a conversion based on the advertisement being presented as an advertisement impression and the user receiving the advertisement impression visiting a location associated with the advertiser. In such embodiments, information regarding each advertisement impression presented by the end user network device 150 is stored on the end user network device 150. The advertisement distribution system 131 can log the number of times that each advertisement is transmitted to an end user for presentation and thus, the number of advertisement impressions for the advertisement. The advertisement distribution system 131 can use the number of advertisement impressions and number of times an end user that received the advertisement to compute advertisement conversions.

In block 245, a logging token is stored at the advertisement distribution system 131. This logging token indicates which advertisement was selected and can be used to update advertisement performance information for the selected advertisement and the non-selected advertisements. The logging token also may include information identifying a particular merchant or merchant location that the landing page instructed the end user to visit. For example, if the landing page instructed the end user to check in at a particular bookstore, then the token may include information identifying that particular bookstore.

The logging token also may include an advertisement impression code associated with the particular advertisement impression for the end user network device 150. This advertisement impression code may be used by the conversion logging module 135 to determine whether the presentation of the advertisement resulted in a conversion as discussed below. That is, the advertisement distribution system 131 may issue a unique advertisement impression code for each advertisement impression for conversion logging purposes and store that code when the advertisement is served and/or selected. This unique advertisement impression code also may be transmitted to the end user network device 150, for example along with or in place of the information identifying the advertisement. The end user network device 150 cans store the advertisement impression code, for example in the data storage device 157.

In certain exemplary embodiments, the advertisement distribution system 131 receives information identifying the user or the end user network device 150 and stores this information with the logging token. In such embodiments, the advertisement distribution system 131 may log advertisement conversions based on a comparison of the user information and information regarding merchants and other advertisers that the user visits. For example, if the user selects an advertisement for a particular restaurant, information regarding the restaurant and the user that selected the advertisement may be stored with the token. If the user visits the restaurant (as determined from NFC check in information for example), and information regarding this visit is received by the advertisement distribution system 131, then the advertisement distribution system 131 can conclude that a conversion was made.

In block 250, the end user proceeds to a physical location of the merchant 170 associated with the selected advertisement and checks in with the NFC base station 175 at the merchant's location. For example, the end user may place the end user network device 150 near the NFC base station 175 such that the NFC module 155 and NFC module 175 can establish a communication channel.

In block 255, with the communication channel established, the NFC module 177 transmits an NFC device identifier for the NFC base station 175 to the NFC module 155 of the end user network device 150. The end user network device 150 may store the NFC identifier, for example in the data storage device 157. The NFC device identifier is a unique identifier for the NFC base station 175 that allows the advertisement provider 130 to determine what NFC base station 175 the end user network device 150 has checked in with. Thus, each NFC base station 175 has a unique NFC device identifier.

The NFC device identifier may be assigned to the NFC base station 175 by the manufacturer of the NFC base station 175 and provided to the advertisement provider 130 by the NFC base station manufacturer or the merchant 170 having the NFC base station 175. Or, the advertisement provider 130 may issue the NFC base stations 175 to merchants 170 and record the NFC device identifier prior to deploying the NFC base station 175.

The advertisement provider network device 130 logs NFC device identifiers for each NFC base station 175 in the advertisement index 139 or another data storage location. In this log, each NFC device identifier is correlated to the merchant 170 and/or merchant location that the NFC base station 175 is deployed. In certain exemplary embodiments, rather than transmit an NFC device identifier, the NFC module 177 transmits a merchant or merchant location identifier maintained by the NFC controller 179. A merchant identifier identifies the merchant 150 having the NFC base station 175 and the merchant location identifier identifies a particular merchant location, for example if the merchant 170 has multiple brick and mortar stores. Regardless of the type of identifier, this identifier is used by the advertisement distribution system 131 to determine what merchants 170 and/or merchant locations end users visit and ultimately to log advertisement conversions.

In certain exemplary embodiments, the NFC module 177 transmits the NFC device identifier (or other identifier) to the NFC module 155 as an encrypted token. As discussed above, the NFC base station 170 includes a cryptographic key for signing data transmitted by the NFC module 177 with a secure signature. The NFC controller 179 signs the encrypted token carrying the NFC device identifier with the secure signature so that the advertisement provider 130 can authenticate the end user's visit to the merchant 170. The use of secure communications prevents users or others from providing false merchant visits.

In certain exemplary embodiments, the encrypted token is embedded in a Uniform Resource Locator ("URL"). In response to receiving the URL, the end user browser application module 153 connects to the URL and transmits information to a web server associated with the URL, for example the advertisement provider network device 130. As discussed below with reference to block 260, the transmitted information may include information regarding the advertisement selected in block 230 of the method 200 of FIG. 1 and the NFC device identifier received from the NFC module 177. In such an embodiment, encrypting the NFC device identifier can be important. For example, without encryption, end users may copy and publish the URL online and other end users can easily fake merchant visits.

In block 260, the end user network device 150 transmits the information regarding the selected advertisement (stored on the end user network device 150) and the received NFC product identifier to the advertisement provider network device 130. The information regarding the selected advertisement transmitted to the advertisement provider network device 130 also can include the advertisement impression code for the advertisement impression.

As discussed above, the NFC identifier may be received in a token also having a URL that links to the advertisement provider network device 130. Upon receipt of the URL, the browser application module 153 connects to the advertisement provider network device 130 and transmits the information. In one embodiment, the NFC module 177 transmits the URL to the NFC module 157 embedded in an NFC Data Exchange Format ("NDEF") record or other electronic data transmission format. The NFC module 155 parses the NDEF record and identifies the URL. In response to identifying the URL, the NFC module 155 may prompt the end user operating the end user network device 150 to connect to the URL, for example with a message such as "Connect to www.examplewebsite.com." If the user acknowledges, the browser application module 153 navigates to the URL and the information is transmitted to the advertisement provider network device 130.

In block 265, the advertisement provider network device 130 receives the information from the end user network device 150 and processes the information. In certain exemplary embodiments, processing the information includes decrypting the information, for example using a cryptographic key corresponding to the cryptographic key of the NFC base station 175. In certain exemplary embodiments, processing the information includes verifying a signature for the data corresponds to the NFC base stations 175. The advertisement provider network device 130 stores the decrypted information in the advertisement index 139 or another data storage location.

In block 270, the conversion logging module 135 uses the received information to update conversion logging information. In one embodiment, the conversion logging module 135 compares the NFC device identifier to the log of NFC device identifiers to determine the merchant 170 and/or the merchant location that the NFC base station 175 is deployed. The conversion logging module 135 also determines whether the selected advertisement corresponds or is associated with the merchant 170 visited by the end user (as determined by the received NFC device identifier). If the advertisement corresponds to the visited merchant 170, then the conversion logging module 135 concludes that there is a conversion for the advertisement and updates the conversion logging information for the selected advertisement accordingly.

In one embodiment, the conversion logging module 135 compares the advertisement impression code transmitted from the end user network device 150 to the unique advertisement impression code stored at the advertisement distribution system 131 to determine the advertisement impression the end user is associated with. The conversion logging module 135 can then determine whether that advertisement impression was for the merchant 170 visited by the end user 150 using information regarding the advertisement impression and the NFC device identifier. If the advertisement impression code is associated with the visited merchant 170, then the conversion logging module 135 may conclude that the advertisement resulted in a conversion.

In certain exemplary embodiments, the end user network device 150 transmits information regarding each NFC base station 175 that the end user network device 150 checks in with and information regarding each advertisement selected using the end user network device 150 periodically, for example via a batch process. In such embodiments, the conversion logging module 135 can evaluate the received information to determine whether any of the advertisements correspond to a visited merchant 170 and update advertisement conversion information accordingly.

In block 275, the advertisement provider network device 130 transmits advertisement conversion information to the merchant network device 173 so that the merchant 170 can review the conversion information. For example, the advertisement provider network device 130 may periodically transmit advertisement conversion information for each advertisement of the merchant 170 stored in the advertisement repository 137. In another example, the advertisement provider 130 may maintain a secure website that merchants 170 and other advertisers can log into to view their respective advertisement conversion information.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for logging advertisement conversions, comprising:
    recording, by a computing device, information identifying an advertisement associated with an advertiser, the information identifying the advertisement comprising an identification of an advertisement transmitted to a user mobile computing device, wherein the identification of the advertisement is stored on the user mobile computing device in response to an impression of the advertisement on the user mobile computing device;
    receiving, by the computing device, notification from the user mobile computing device that the user mobile computing device received, from an item at a location associated with a merchant, merchant-identifying information identifying the merchant, the notification comprising at least the merchant-identifying information and the identification of the advertisement stored on the user mobile computing device, wherein the item at the location associated with the merchant transmitted a Uniform Resource Locator ("URL") to the user mobile computing device that causes the user mobile computing device to transmit the notification to the computing device;
    determining, by the computing device, that the advertiser associated with the advertisement is the merchant based at least in part on a determination that the information identifying the advertisement recorded by the computing device matches the identification of the advertisement stored and transmitted by the user mobile computing device and the merchant-identifying information; and
    in response to the determination that the advertiser associated with the advertisement is the merchant, logging, by the computing device, conversion information indicating that the transmission of the advertisement resulted in a conversion event.

2. The computer-implemented method of claim 1, wherein the impression of the advertisement comprises a selection of the advertisement on the user mobile computing device.

3. The computer-implemented method of claim 1, wherein the user mobile computing device comprises a near field communication (NFC) enabled item, and wherein the user mobile computing device transmits the information identifying the advertisement and the information identifying the merchant in response to the user mobile computing device being placed near a NFC-enabled item at the location associated with the merchant.

4. The computer-implemented method of claim 3, wherein the NFC-enabled item transmits the URL and the information identifying the merchant to the user mobile computing device via an NFC communication channel.

5. The computer-implemented method of claim 1, further comprising:
    receiving an indication that the advertisement has been selected; and
    causing an advertisement landing page to display in response to the advertisement being selected, the advertisement landing page comprising instructions for visiting a location of the merchant.

6. The computer-implemented method of claim 5, wherein the user mobile computing device comprises a near field communication (NFC) enabled item and wherein the landing page further comprises a promotional offer redeemable at the location of the merchant in response to placing the user mobile computing device near an NFC-enabled item at the location associated with the merchant.

7. The computer-implemented method of claim 6, wherein further comprising providing details of the promotional offer in response to the user mobile computing device being placed near NFC-enabled item at the location associated with the merchant.

8. The computer-implemented method of claim 1, wherein the information identifying the merchant comprises a device identifier for the item.

9. The computer-implemented method of claim 1, wherein the information identifying the merchant comprises a secure signature.

10. A computer program product, comprising:
    a non-transitory computer-readable medium having computer-readable program code embodied therein that when executed by a computer processor cause the computer processor to log advertisement conversions, the computer-readable program code comprising:
        computer-readable program code for recording information identifying an advertisement associated with an advertiser, the information identifying the advertisement comprising an identification of an advertisement transmitted to a user mobile computing device, wherein the identification of the advertisement is stored on the user mobile computing device in response to an impression of the advertisement on the user mobile computing device;

computer-readable program code for receiving notification from the user mobile computing device that the user mobile computing device received, from an item at a location associated with a merchant, merchant-identifying information identifying the merchant, the notification comprising at least the merchant-identifying information and the identification of the advertisement associated with the advertiser stored on the user mobile computing device, wherein the item at the location associated with the merchant transmitted a Uniform Resource Locator ("URL") to the user mobile computing device that causes the user mobile computing device to transmit the notification to the computing device;

computer-readable program code for determining that the advertiser is associated with the merchant based at least in part on a determination that the information identifying the advertisement recorded by the computing device matches the identification of the advertisement stored and transmitted by the user mobile computing device and the merchant-identifying information; and computer-readable program code for logging conversion information indicating that the transmission of the advertisement resulted in a conversion event in response to the determination that the advertiser associated with the advertisement is the merchant.

11. The computer program product of claim 10, wherein the item comprises a short-range communication device operable to transmit the information identifying the merchant to the user mobile computing device.

12. The computer program product of claim 11, wherein the short-range communication device comprises one of a Near Field Communication ("NFC") device, a Bluetooth device, an induction wireless device, an infrared wireless device, a WiFi device, and an RFID transmitter.

13. The computer program product of claim 11, wherein the short-range communication device transmits the URL and the information identifying the merchant to the user mobile computing device via a short-range communication channel.

14. The computer program product of claim 10, further comprising computer-readable program code for causing an advertisement landing page to display in response to the advertisement being selected, the advertisement landing page comprising instructions for visiting a location associated with the merchant.

15. The computer program product of claim 14, wherein the user mobile computing device comprises a device capable of communicating with a short-range communication device, and wherein the landing page further comprises a promotional offer redeemable at the location associated with the merchant in response to placing the user mobile computing device near the short-range communication device at the location associated with the merchant.

16. The computer program product of claim 15, further comprising computer-readable program code for providing details of the promotional offer in response to the user mobile computing device being placed near the short-range communication device at the location associated with the merchant.

17. A system for logging advertisement conversions, comprising:
a storage device; and
a processor communicatively coupled to the storage device, wherein the processor executes application code instructions stored in the storage device to cause the system to:
transmit an advertisement for presentation on a user mobile computing device, the advertisement associated with an advertiser;
record information identifying the advertisement, the information identifying the advertisement comprising an identification of the advertisement transmitted to the user mobile computing device, wherein the identification of the advertisement is stored on the user mobile computing device in response to an impression the advertisement on the user mobile device;
receive notification that the user mobile computing device received merchant-identifying information from an item at a location associated with a merchant, the notification comprising at least the merchant-identifying information and the identification of the advertisement associated with the advertiser stored on the user mobile device, wherein the item at the location associated with the merchant transmitted a Uniform Resource Locator ("URL") to the user mobile computing device that causes the user mobile computing device to transmit the notification to the system;
determine that the advertiser associated with the advertisement is the merchant based at least in part on a determination that the recorded information identifying the advertisement corresponds to the identification of the advertisement stored and transmitted by the user mobile computing device and the merchant-identifying information; and
log conversion information indicating that transmission of the advertisement resulted in a conversion event, in response to determining that the advertiser associated with the advertisement is the merchant.

18. The system of claim 17, wherein the impression of the advertisement comprises a selection of the advertisement.

19. The system of claim 17, wherein the information identifying the advertisement is stored on the user mobile computing device, and wherein the information identifying the advertisement and the information identifying the merchant is transmitted from the user mobile computing device to a conversion logging module.

20. The system of claim 17, wherein the user mobile computing device comprises a Near Field Communication ("NFC") module, and wherein the user mobile computing device transmits the information identifying the advertisement and the information identifying the merchant in response to the NFC module establishing a communication channel with the item at the location associated with the merchant.

21. The system of claim 20, wherein the item at the location associated with the merchant transmits the URL and the information identifying the merchant to the user mobile computing device via the established communication channel.

22. The computer-implemented method of claim 1, wherein the item comprises a short-range communication device operable to transmit the information identifying the merchant to the user mobile computing device.

23. The computer-implemented method of claim 22, wherein the short-range communication device comprises one of a Near Field Communication ("NFC") device, a Bluetooth device, an induction wireless device, an infrared wireless device, a WiFi device, and an RFID transmitter.

* * * * *